United States Patent
Fukuda

(10) Patent No.: US 7,468,812 B2
(45) Date of Patent: Dec. 23, 2008

(54) IMAGE PROCESSING APPARATUS AND ITS METHOD FOR COLOR CORRECTION

(75) Inventor: Yasuo Fukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 579 days.

(21) Appl. No.: 11/180,450

(22) Filed: Jul. 13, 2005

(65) Prior Publication Data

US 2006/0012839 A1     Jan. 19, 2006

(30) Foreign Application Priority Data

Jul. 15, 2004   (JP) .............................. 2004-208883

(51) Int. Cl.
*G06F 15/00* (2006.01)
*G03F 3/08* (2006.01)

(52) U.S. Cl. ....................... 358/1.9; 358/518

(58) Field of Classification Search ................. 358/518, 358/500, 474, 471, 400, 1.1, 1.9; 347/129, 347/112, 111; 382/162, 163, 167
See application file for complete search history.

(56) References Cited

U.S. PATENT DOCUMENTS

| | | | |
|---|---|---|---|
| 4,646,144 A | | 2/1987 | Ishida et al. |
| 5,710,872 A | * | 1/1998 | Takahashi et al. ............. 358/1.9 |
| 5,742,410 A | | 4/1998 | Suzuki |
| 5,805,727 A | | 9/1998 | Nakano |
| 6,239,886 B1 | | 5/2001 | Klassen et al. |
| 6,343,141 B1 | | 1/2002 | Okada et al. |
| 6,750,890 B1 | * | 6/2004 | Sugimoto .................... 715/838 |
| 6,987,535 B1 | | 1/2006 | Matsugu |
| 7,079,284 B2 | | 7/2006 | Kawakami et al. |
| 7,356,190 B2 | | 4/2008 | Mizoguchi et al. |
| 2004/0125410 A1 | | 7/2004 | Shirata et al. |
| 2004/0184671 A1 | | 9/2004 | Fukuda et al. |
| 2006/0013478 A1 | | 1/2006 | Ito et al. |

FOREIGN PATENT DOCUMENTS

| | | |
|---|---|---|
| JP | 2001-043371 | 2/2001 |
| JP | 2001-043388 | 2/2001 |
| JP | 2003-143408 | 5/2003 |

OTHER PUBLICATIONS

Yang, et al. "Detecting Faces in Images: A Survey" IEEE Transaction of Pattern Analysis and Machine Intellegence, vol. 24, No. 1, Jan. 2002.

The above references were cited in a Jun. 12, 2008 US Office Action issued in the counterpart U.S. Appl. No. 11/180,451.

Kotera, "Image Signal Processing for Hard Copy", The Journal of the Institute of Television Engineers of Japan, vol. 43, No. 11 (1989), pp. 1205-1212 (no translation provided).*

Yang, et al. "Detecting Faces in Images: A Survey" IEEE Transaction of Pattern Analysis and Machine Intellegence, vol. 24, No. 1, Jan. 2002.*

* cited by examiner

*Primary Examiner*—Gabriel I Garcia
(74) *Attorney, Agent, or Firm*—Cowan, Liebowitz & Latman, P.C.

(57) ABSTRACT

It is desired to easily and effectively correct hue and saturation in a predetermined region, for an image which cannot be desirably corrected by conversion of the brightness or colors of the entire image. To this end, an image is loaded onto a RAM, and the contrast and color balance of the input image are corrected. A predetermined region is extracted from the corrected image, and it is checked if a predetermined region is set. If the predetermined region is set, a color correction process of the predetermined region is executed.

7 Claims, 8 Drawing Sheets

IMAGE PROCESSING APPARATUS AND ITS METHOD FOR COLOR CORRECTION

FIELD OF THE INVENTION

The present invention relates to an image processing apparatus and its method and, more particularly, to a color correction process of a color image in a color image device such as a digital camera, scanner, display, printer, or the like, and image processing software.

BACKGROUND OF THE INVENTION

Color appearance of a color image device must faithfully reproduce an original color. On the other hand, color appearance favored by people is also important and, especially, flesh color, sky blue, plant green, and the like must be color appearance favored by people. For example, when an object image is sensed by a digital camera and is recorded as digital image data, exposure is controlled upon image sensing, and the color balance, hue, saturation, and tone of color image data output from an image sensor are corrected, so as to obtain an image with appropriate brightness.

However, these processes associated with color conversion correct the brightness and colors of the entire image but cannot individually correct a color to be corrected. For this reason, when correction is applied to have a color to be corrected as a target color, other colors are influenced, and the entire image is not always corrected to favorable colors. For example, when a person in the shade is to be sensed, if the brightness level of his or her flesh is increased to a target brightness level, other regions which originally have favorable brightness levels become excessively bright. When the flesh color has a bluish tint or is excessively yellowish due to the influence of local illumination, if it is corrected to a favorable color, the colors of other regions which originally have favorable colors become unnatural.

In order to solve these problems, for example, Kotera "Image signal processing for hard copy", The Journal of the Institute of Television Engineers of Japan, Vol. 43, No. 11 (1989), pp. 1205-1212, introduces a selective color adjustment model. With this model, a color region which is to undergo color correction is designated, and the hue and saturation in the designated color region are corrected in a favorable direction.

According to the above reference, color adjustment is perceptually made using the hue correction amount and saturation scale. However, how to determine the hue correction amount and saturation scale is not explained in concrete terms. If color adjustment is made by setting the hue correction amount and saturation scale to be appropriate values, an image becomes unnatural due to too large a correction amount or an expected effect cannot be obtained due to too small a correction amount. A method of confirming a correction result image by displaying it on a display or printing it using a printer, and exploring an optimal hue correction amount and saturation scale while perceptually adjusting an image requires expert knowledge in adjustment or a huge number of times of trials.

Given an image which cannot be desirably corrected by conversion of the brightness or colors of the entire image, it is demanded to easily and effectively apply correction of hue and saturation in a desired color region of such an image.

SUMMARY OF THE INVENTION

One aspect of the present invention discloses a technique which extracts predetermined regions from an input image, extracts a representative color for each predetermined region, sets a color region to be corrected including the representative color, and a correction coefficient used to control a color correction amount on the basis of the difference between the representative color and a target color for each predetermined region, and corrects each predetermined region of the input image on the basis of the color region to be corrected and correction coefficient, which are set for that predetermined region.

According to the present invention, correction of hue and saturation in a predetermined region can be easily and effectively applied to an image which cannot be desirably corrected by conversion of the brightness or colors of the entire image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail hereinafter with reference to the accompanying drawings.

An image processing apparatus of this embodiment comprises a computer such as a personal computer (PC), workstation (WS), or the like. The image processing apparatus detects a predetermined color region or object region from an image which is input from a digital camera or scanner, is downloaded from the Internet, or is loaded from a storage medium such as a CD-ROM, DVD-ROM, or the like, and applies appropriate correction to that region. The image processing apparatus of this embodiment that executes such process will be explained in more detail hereinafter. Especially, this embodiment will exemplify a case wherein a predetermined color region (e.g., a flesh color region) or a predetermined object region (human face region) is detected from an image sensed by a digital camera, and appropriate correction is applied to that region.

[Arrangement]

Figure 1:
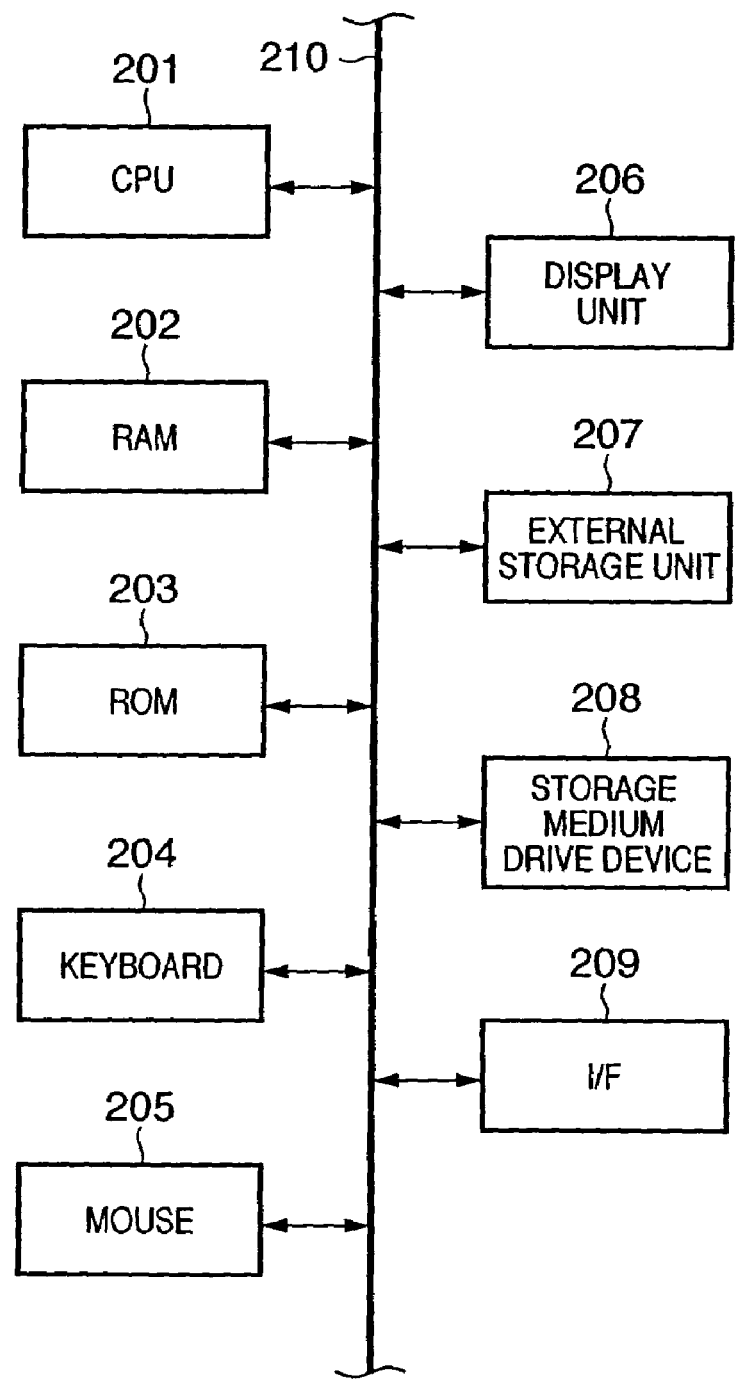
FIG. 1 is a block diagram showing the basic arrangement of an image processing apparatus according to an embodiment of the present invention.

FIG. 1 is a block diagram showing the basic arrangement of an image processing apparatus according to this embodiment.

A CPU 201 controls the overall apparatus using programs and data stored in a RAM 202 and ROM 203, and executes various kinds of processing to be described later.

The RAM 202 comprises an area for temporarily storing programs and data which are loaded from an external storage device 207 such as a hard disk or the like or a storage medium mounted on a storage medium drive device 208, and also a work area used by the CPU 201 to execute various kinds of processing. The ROM 203 stores a boot program, setting data of the apparatus, and the like.

A keyboard 204 and mouse 205 are input devices used when the user inputs various instructions and information to the CPU 201. A display unit 206 comprises a CRT, liquid crystal display, or the like, and the CPU 201 displays a graphical user interface, and characters, images, and the like indicating the processing result on the display unit 206.

The external storage device 207 is a large-capacity storage device such as a hard disk drive device, which stores an operating system (OS), and programs and data for making the CPU 201 execute various kinds of processing to be described later. The programs and data stored in the external storage device 207 are loaded onto the RAM 202 under the control of the CPU 201 as needed.

Programs and data recorded on a storage medium such as a CD-ROM, DVD-ROM, or the like mounted on the storage medium drive device 208 are loaded onto the RAM 202 or external storage device 207 under the control of the CPU 201 as needed. Some of programs and data stored in the external storage device 207 may be recorded on the storage medium. When these programs and data are used, the CPU 201 controls the storage medium drive device 208 to read out the programs and data and to store them in the RAM 202.

An interface (I/F) 209 comprises a serial bus interface such as USB (Universal Serial Bus), IEEE1394, and the like, which are used to connect a digital camera, printer, and the like, and a network interface which is used to connect a network line such as the Internet, LAN, or the like.

The aforementioned components are connected to each other via a system bus 210.

[Functional Arrangement]

Figure 2:
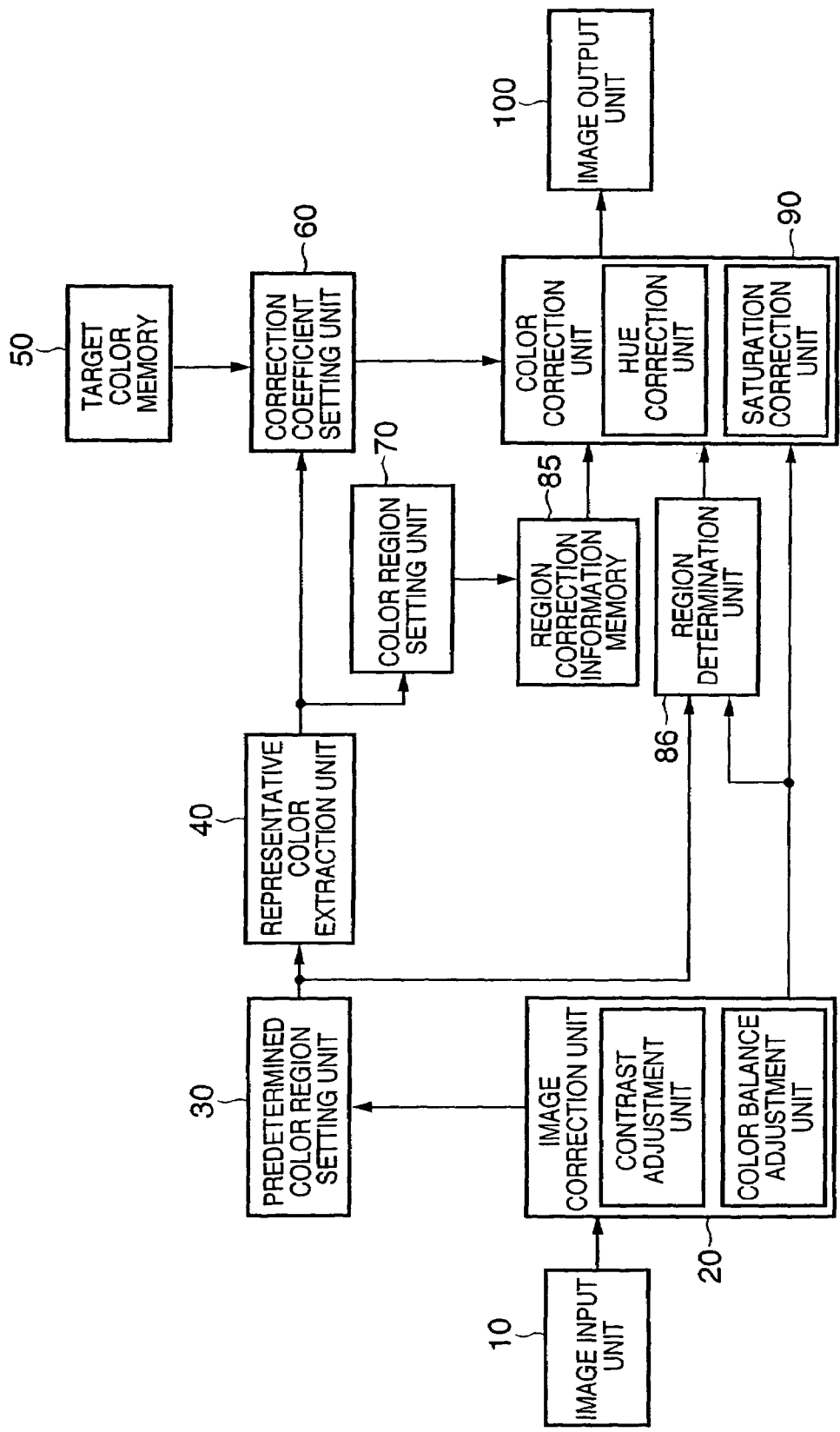
FIG. 2 is a block diagram showing the functional arrangement of the image processing apparatus.

FIG. 2 is a block diagram showing the functional arrangement of the image processing apparatus.

An image input unit 10 inputs image data to be processed from a digital camera or the like connected to the I/F 209. Of course, image data to be processed (to be referred to as "input image" hereinafter) may be input from the external storage device 207, storage medium, or a server on the network. Note that a person's face appears as an object in the input image.

An image correction unit 20 adjusts the contrast, color balance, and the like of the input image. However, a method of adjusting them is not particularly limited. For example, an adjustment method using a histogram and tone curve is preferable. An image, in which a predetermined color such as a flesh color or the like is not reproduced to a favorable color irrespective of the adjustment of the image correction unit 20, undergoes color correction of a predetermined color region by a color correction unit to be described later. Note that a flesh color region indicating a flesh color will be explained as a typical example of the predetermined color region, but the present invention can also be applied to color regions such as sky blue, plant green, sunset red, navy blue, and the like, which are associated with color appearance favored by people.

A predetermined color region setting unit 30 sets a predetermined color region to be corrected from the image corrected by the image correction unit 20. However, the setting method is not particularly limited. For example, a method of using face information detected by a face detection unit, a method of designating an arbitrary hue or saturation value, and the like may be used. Alternatively, the user may designate a color region or may designate or select an arbitrary hue or saturation value by operating the keyboard 204 or mouse 205. Of course, the user may designate a rough image region, and face detection may be applied to the designated image region or a hue or saturation value may be designated.

Further, the user can select a predetermined color region from the result of segmentation which segments an input image. Furthermore, the user can selects a region included in a specific region in a color space by obtaining a representative color of each segmented region.

Any method, such as the method disclosed in JPA 2001-043371, JPA2001-043388, JPA2003-143408, or the like, is available for the segmentation. Note that the specific region in the color space is set in accordance with an object should be extracted in advance, or the user can set the specific region in the color space.

A representative color extraction unit 40 extracts a representative color from color information of the predetermined color region set by the predetermined color region setting unit 30. Like flesh color regions in a case wherein many people appear in a single image (e.g., a group photograph), a plurality of predetermined color regions may exist in an input image. In such case, the representative color extraction unit 40 extracts representative colors from color information of respective predetermined color regions. The representative color includes, e.g., the averages values, medians, modes, or the like of hue and saturation values of pixels within the predetermined color region.

A color region setting unit 70 determines a color region to be corrected including the representative color extracted by the representative color extraction unit 40 from the color information of the predetermined color region set by the predetermined color region setting unit 30 for each predetermined color region. A target color memory 50 stores correction target colors corresponding to the colors of predetermined color regions in correspondence with the types of the predetermined color regions. A correction coefficient setting unit 60 sets a correction coefficient used in a color correction unit 90 on the basis of the correction target color stored in the target color memory 50 and the representative color extracted by the representative color extraction unit 40. A region correction information memory 85 stores the correction coefficient set by the correction coefficient setting unit 60 and the color region to be corrected set by the color region setting unit 70 for each predetermined color region set by the predetermined color region setting unit 30.

A region determination unit 86 determines if a pixel to be corrected (pixel of interest) belongs to a predetermined color region. If the pixel of interest belongs to the predetermined color region, the unit 86 determines that predetermined color region. When the pixel of interest belongs to the predetermined color region on the basis of the determination result of the region determination unit 86, the color correction unit 90 reads out the correction coefficient and the color region to be corrected corresponding to that predetermined color region from the region correction information memory 85, and applies color correction to the pixel of interest using them.

The color-corrected image is output to, e.g., a printer, the external storage device 207, or a server on the network by an image output unit 100. Alternatively, the color-corrected image may be returned to the digital camera that inputs the original image, and may be stored as a new image or may be overwritten on the original image on its storage medium.

[Processing Sequence]

Figure 3:
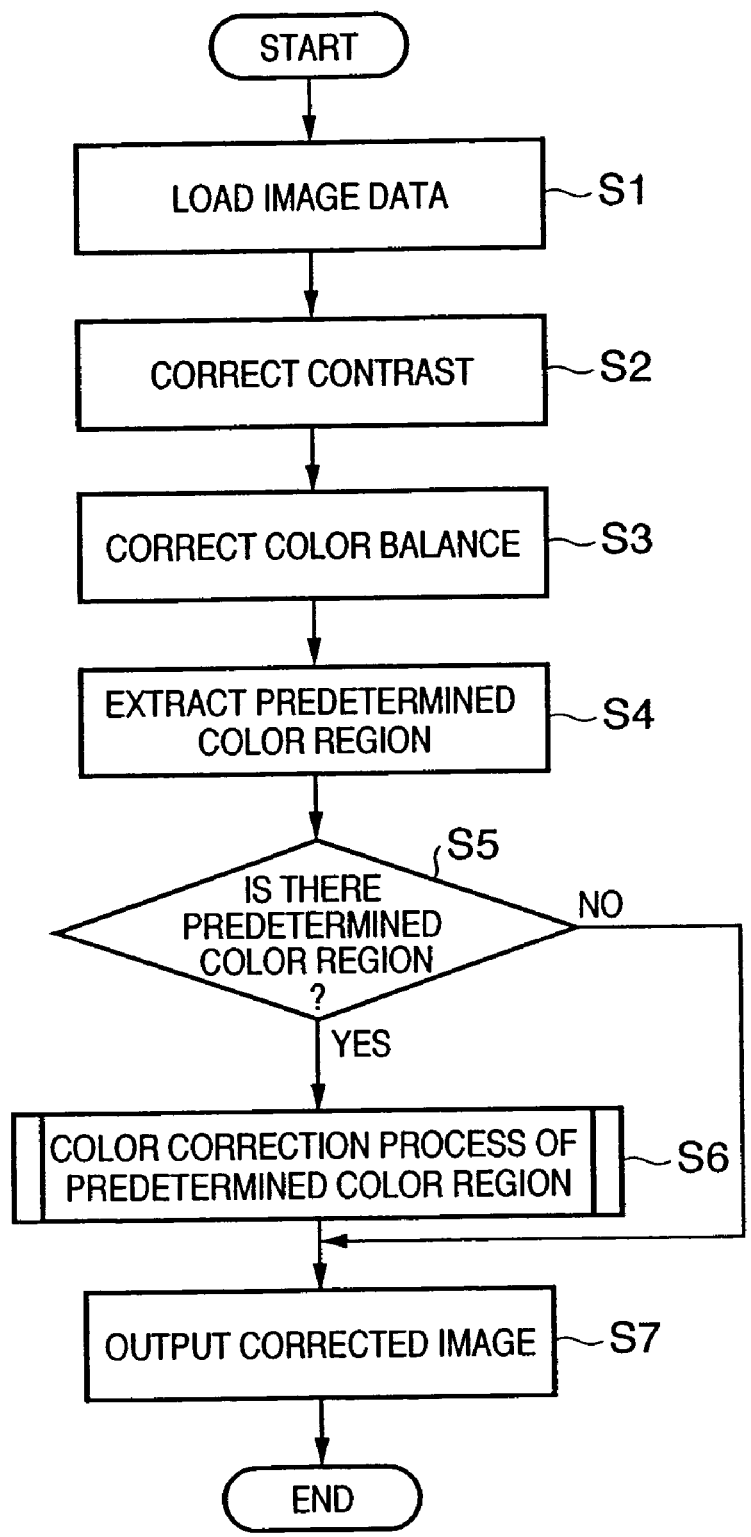
FIG. 3 is a flowchart showing an image correction process executed by a CPU.

FIG. 3 is a flowchart showing an image correction process executed by the CPU 201.

An input image is loaded onto the RAM 202 (S1). The loading method is not particularly limited. For example, the user may designate a file name of image data to be processed saved on the external storage device 207, storage medium, or server using the keyboard 204 or mouse 205, so as to instruct the CPU 201 to load it. Alternatively, the user may connect a digital camera (or scanner) to the I/F 209, and may instruct the digital camera (or scanner; in practice, driver software for each of these devices, which is loaded onto the RAM 202) to transfer image data saved in the internal memory of the digital camera (or image data scanned by the scanner) to the RAM 202, thus loading the image data to be processed onto the RAM 202.

The image data to be processed is an RGB image in which each channel of one pixel is expressed by 8 bits, and its image size is an M×N pixels (M is the number of pixels in the horizontal direction, and N is the number of pixels in the vertical direction). The image data to be processed is formed of a total of three planes, i.e., a plane formed of only R (red) pixel values, a plane formed of only G (green) pixel values, and a plane formed of only B (blue) pixel values. However, the present invention is not limited to this, and a color image formed of one plane may be used. Furthermore, when the image data to be processed is compressed by, e.g., JPEG, the CPU 201 decompresses the image data to generate an image in which each pixel is expressed by R, G, and B color components.

The bit length of each channel of the image data is not limited to 8, and 12 bits, 16 bits, or the like per channel may be used. Alternatively, pixel value expression is not limited to an integer, and real values may be used.

The following description will be given using the RGB image. Even when other color spaces such as LCH, YCbCr, L*u*v*, HSV, HSL, and the like are used, they can be converted into a color space to be processed by this embodiment in a previous stage, and appropriate processes can be made. In this case, when the color space of image data is the same as that to be processed by this embodiment, the processes may be made by directly using original image data.

The contrast of the input image loaded onto the RAM 202 is corrected (S2). The correction method of this contrast correction process is not particularly limited. For example, a method of appropriately correcting the contrast using a luminance histogram or a tone curve that represents the input/output relationship or the like may be used. Next, the color balance of the input image is appropriately corrected (S3). This color balance correction method is not particularly limited. For example, a color balance method that uses a histogram or a tone curve that represents the input/output relationship or the like may be used.

A predetermined color region is extracted from the corrected image in accordance with the predetermined color region setting of the predetermined color region setting unit 30 (S4), and it is checked if a predetermined color region is set (S5). If no predetermined color region is set, the corrected image is output to, e.g., the printer, external storage device 207, server on the network, or the like (S7). If the predetermined color region is set, the aforementioned color correction unit 90 executes a color correction process of the predetermined color region (S6), and the corrected image is then output (S7).

The extraction method of a predetermined color region is not particularly limited. For example, when a flesh color region is used, a method of using face information detected by a face detection process, a method of designating an arbitrary hue or saturation value, or the like may be used. Further, the input image is segmented by the segmentation, the representative color of each segmented region is obtained, and evaluation, which determines whether or not the representative color is included in the specific region of the color space, is executed so as to select a region. Note that the specific region in the color space is set in accordance with an object should be extracted in advance, or the user can set the specific region in the color space.

When a face region including a face of an object is used, a predetermined color region may be automatically set using the face detection process, or the user may interactively set a predetermined color region using the keyboard 204 or mouse 205 by displaying an image on the display unit 206. In the processes of this embodiment, if position information of a face region is available, it suffices to the processes to be described later. Hence, an image used to set the face region may be either an image before or after the processes in steps S2 and S3.

A method of using face information of a face detection result will be described as one example. As a process for detecting a face region in an image, a face rectangular region can be detected using a method described in Yang, et al. "Detecting Faces in Images: A Survey" IEEE TRANSACTIONS ON PATTERN ANALYSIS AND MACHINE INTELLIGENCE, VOL. 24, No. 1, January 2002. Two pieces of position information of the detected two eyes are acquired, and a predetermined rectangular region having, as sides, a line segment that connects the two eyes, and a line segment perpendicular to that line segment is defined, and the average value and covariance matrix of RGB values of pixels in that rectangular region are calculated. These RGB average value and covariance matrix, and the Mahalanobis distances of RGB values of respective pixels in the detected face rectangular region are calculated. A pixel equal to or lower than a threshold is determined as a flesh color pixel, and a set of such pixels is determined as a flesh color region.

Furthermore, spatial coupling of flesh color regions on the image is checked, and coupled flesh color regions are combined to set an image region. This process is implemented by, e.g., checking coupling of flesh color pixels, and assigning identical labels to coupled flesh color pixels. Preferably, in this case, an image region as a small region is removed, although this process is not indispensable. For example, a threshold used to determine a small region is set in advance, and when the number of pixels of a given image region is equal to or smaller than the threshold, that image region is excluded.

In this way, the extracted predetermined color regions are labeled. That is, a label number is assigned to a pixel which belongs to a predetermined color region (e.g., a label number "0" for a region other the predetermined color region, and a label number "j" for the j-th predetermined color region). Note that the label numbers are stored in the RAM 202 in correspondence with the pixel positions of the input image.

Color Correction Process of Predetermined Color Region (S6)

Figure 4:
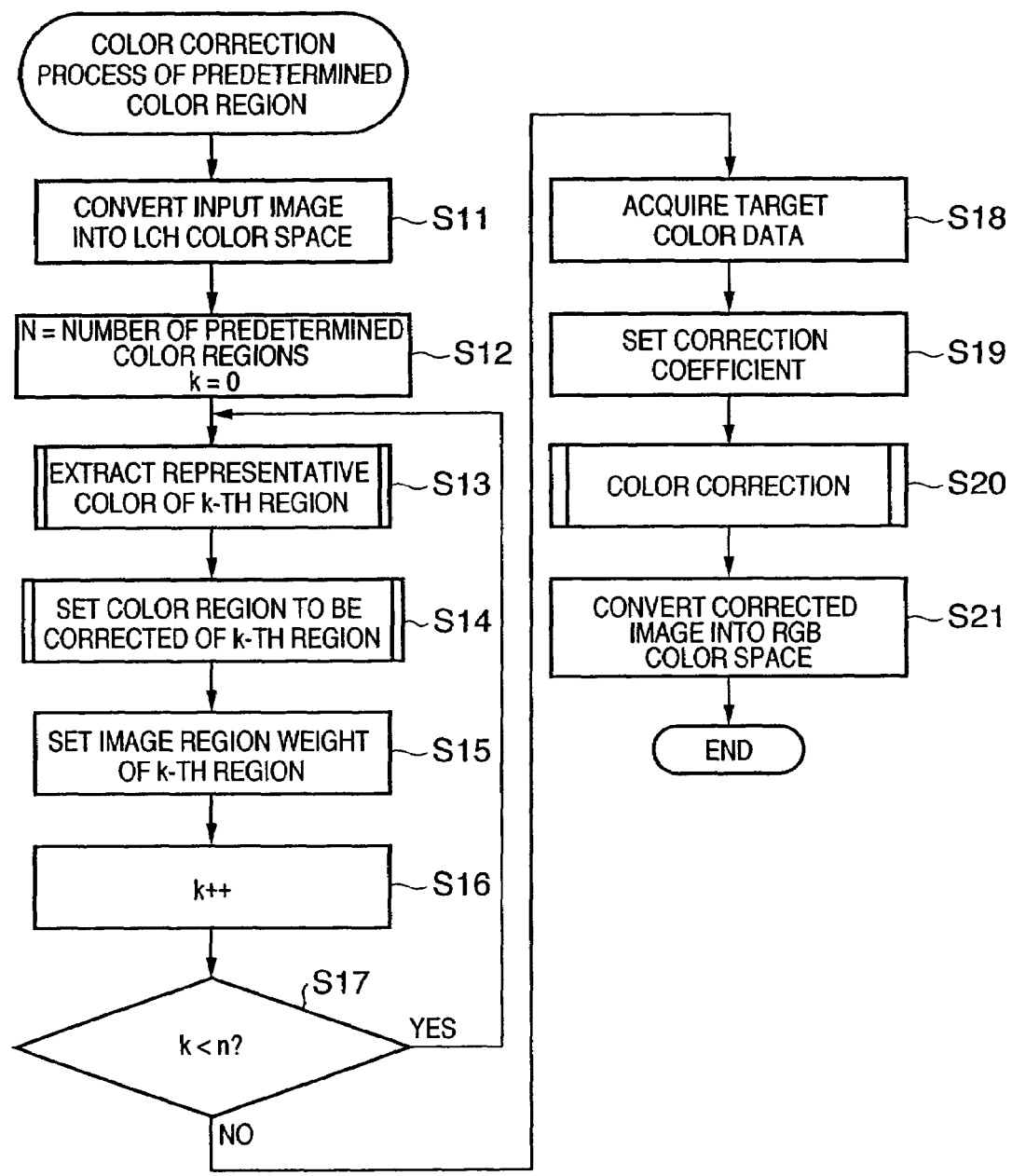
FIG. 4 is a flowchart showing a color correction process of a predetermined color region executed by the CPU.

FIG. 4 is a flowchart showing the color correction process of a predetermined color region (S6) executed by the CPU 201.

The input image expressed by respective values of the RGB color space is converted into an LCH color space (lightness L, saturation C, and hue H) (S11). Note that the color space after conversion is not limited to LCH, but other color spaces such as YCbCr, L*u*v*, HSV, HSL, and the like may be used.

In order to execute a repetition process, the number of extracted predetermined color regions is set in a variable N, and counter k is reset to zero (S12). Then, a representative color is extracted from the k-th predetermined color region (S13).

Figure 5:
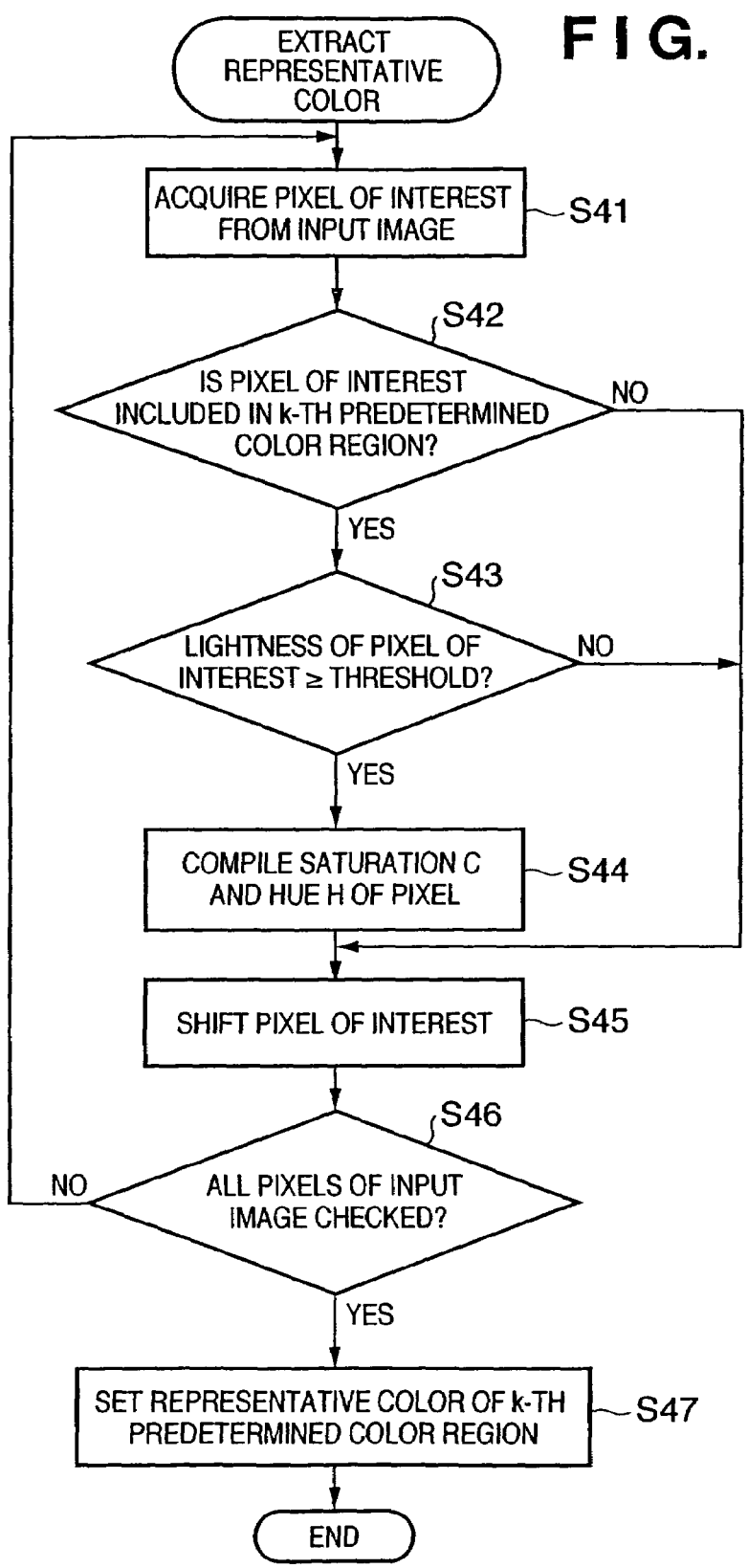
FIG. 5 is a flowchart showing extraction of a representative color.

FIG. 5 is a flowchart showing the representative color extraction process (S13).

A pixel of interest is acquired from the input image (S41), and it is checked with reference to the label number assigned to the pixel of interest if the pixel of interest is a pixel in the k-th predetermined color region (S42). If the pixel of interest is a pixel in the k-th predetermined color region, it is checked if a lightness value L of the pixel of interest is equal to or larger than a threshold Lth (S43). For example, in case of a flesh color region, if the extracted area includes an eye, eyebrow, mustache, or shadow, a representative color cannot often be appropriately obtained. Hence, by the checking processes in steps S42 and S43, pixels that form a region such as a shadow, eye, eyebrow, or mustache, which may have a lower lightness value than a flesh color to be corrected, are excluded.

Next, saturation C and hue H of the pixel of interest which meets the conditions in steps S42 and 43 are compiled (S44). This compiling method varies depending on a representative color to be adopted. For example, when the average value of pixels is used as a representative color, saturation values C and hue values H are simply added up, and the number of pixels for which the sums are compiled is counted.

The pixel of interest is shifted (S45). It is checked if all the pixels of the input image are checked (S46). The processes in steps S41 to S45 are repeated until all the pixels are checked. Upon completion of examination for all the pixels of the input image, the representative color of the k-th predetermined color region is set (S47). When the average values of saturation values C and hue values H of pixels in the predetermined color region are used as a representative color, values Cr and Hr obtained by dividing the sums in step S44 by the count value are set as a representative color (Hr(k), Cr(k)).

Figure 6:
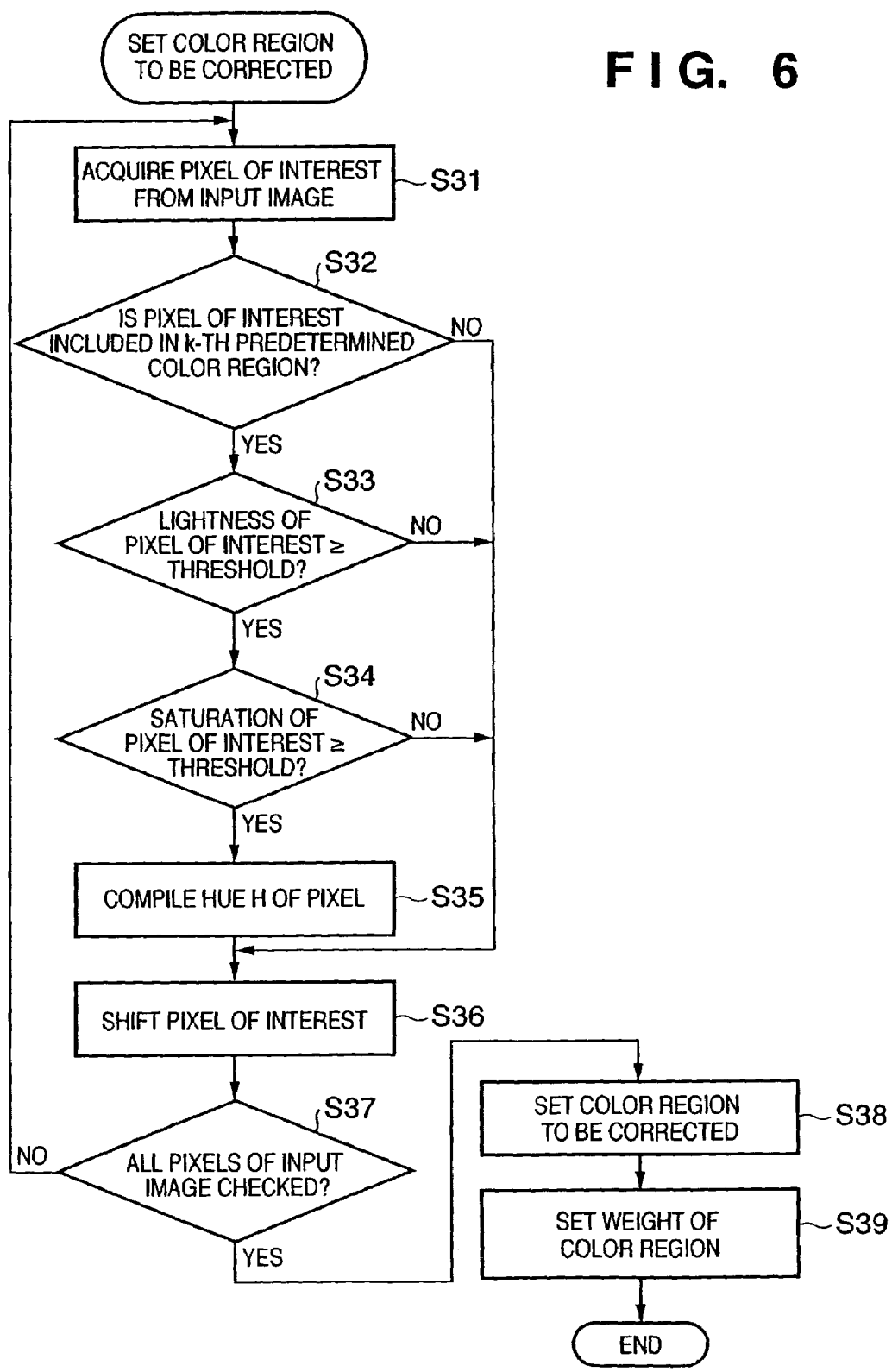
FIG. 6 is a flowchart showing a setting process of a color region to be corrected.

Next, a color region to be corrected is set (S14). FIG. 6 is a flowchart showing the setting process of a color region to be corrected (S14).

Upon setting the color region, paying attention to the hue values of pixels in the k-th predetermined color region, a color region which includes the representative color to be corrected is set, and that region is set as a target region for color correction. This is to prevent the following problem: when correction that changes a flesh color to a favorable one is applied to the entire region of the input image, the colors of other regions in the image, which are originally favorable colors, become unnatural.

A pixel of interest is acquired from the input image (S31). It is checked if the pixel of interest is a pixel of the k-th predetermined color region (S32). If the pixel of interest is a pixel of the k-th predetermined color region, it is checked if a lightness value Lt of the pixel of interest is equal to or larger than a threshold Lth (S33). The checking processes in steps S32 and S33 are to exclude pixels that form a region such as an eye, eyebrow, mustache, or shadow included in the extracted region in case of, e.g., a flesh color region, as in extraction of the representative color.

For the pixel which meets the conditions in steps S32 and S33, it is checked if a saturation value C of that pixel is equal to or larger than a saturation threshold Cth of an achromatic color (S34). When the saturation value C of the pixel of interest is less than the threshold Cth, this means that the pixel of interest is boundlessly close to an achromatic color. The reason why an achromatic color pixel is excluded is to prevent the following problem: hue values change considerably due to slight differences of RGB values in an achromatic color region, and a hue region corresponding to the k-th predetermined color region cannot be determined with high precision.

For the pixel of interest that meets the conditions in steps S32 to S34, the hue value H of that pixel is compiled (S35). This compiling method varies depending on a specific hue value-to be adopted indicating the predetermined color region. For example, a method of analyzing the hue distribution of pixels which meet the conditions in steps S32 to 34, and indicating a color region to be corrected by a maximum hue value Hmax(k) and minimum hue value Hmin(k) may be used.

The pixel of interest is shifted (S36). It is checked if all the pixels of the input image are checked (S37). The processes in steps S31 to S36 are repeated until all the pixels are checked. Upon completion of examination for all the pixels of the input image, the color region to be corrected is set (S38). When the color region to be corrected is indicated by the aforementioned maximum hue value Hmax(k) and minimum hue value Hmin(k), a color region to be corrected is set based on the difference from the representative hue value Hr(k) using the maximum and minimum hue values as the compiling results, as described, e.g., by:

$$\Delta H(k) = \max(|Hmax(k) - Hr(k)|, |Hmin(k) - Hr(k)|) \quad (1)$$

where the function max( ) is a function that selects a maximum one of values in the parentheses.

That is, the color region to be corrected is set as a hue range that includes the k-th predetermined color region extracted in step S4 in FIG. 3.

In the above example, the maximum hue value Hmax(k) and minimum hue value Hmin(k) are automatically derived from the hue distribution of a pixel group which meets the conditions in steps S32 to S34. However, the setting method of a specific hue indicating the color region to be corrected is not limited to this. Depending on the state of the input image, for example, it is often preferable that the user manually sets an arbitrary hue region or selects a hue region registered in advance in the target color memory 50. However, even in such case, the color region to be corrected is preferably set as the hue range that includes the k-th predetermined color region extracted in step S4. Hence, if the k-th predetermined color region is insufficiently included with respect to the user's setting or selection, it is desirable to take an action, e.g., generation of a warning, or the like.

For the set color region, weights of the color region to be used in color correction to be described later are set for each hue range and saturation range (S39).

A hue weight Wh(k) is set to have "1" for the representative color or "0" for a region outside the color region to be corrected by:

When H falls within the range $Hr(k) \pm \Delta H$ $$Wh(k) = |H - Hr(k)| / \Delta H$$

When H falls outside the range $$Wh(k)=0 \quad (2)$$

This is to prevent the continuity of a color from collapsing inside/outside the hue region to be corrected upon executing color correction to be described later.

However, the weight setting method is not limited to that described by equations (2). For example, a setting method which nonlinearly changes using the hue range indicating the color region to be corrected, representative color, and an arbitrary constant or the like may be used.

A saturation weight Wc(k) is set using the saturation value Cr of the target color and the saturation threshold Cth of an achromatic color by:

When C<Cth $$Wc(k)=0$$

When Cth≦C≦Cr(k)

$$Wc(k)=(C-Cth)/(Cr(k)-Cth) \quad (3)$$

When C>Cr(k)

$$Wc(k)=1$$

However, the weight setting method is not limited to that described by equations (3). For example, a method of setting the saturation weight Wc(k) by calculating a saturation range ΔC(k) that includes the predetermined color region by the same setting method of the hue region or the like may be used.

The reason why the color region to be corrected is weighted is to prevent the continuity of a color from collapsing inside/outside the hue region to be corrected upon executing color correction to be described later.

Referring back to the processing shown in FIG. 4, an image region weight Wp(k) used in color correction is set on the basis of the position information of the k-th predetermined color region in the input image (S15). Color correction to be described later is made for only a predetermined color using the weights of each predetermined color region set in step S14, thus avoiding the colors of other regions in the image, which are originally favorable colors, from becoming unnatural. However, when only the color region to be corrected is set, for example, if pixels which are included in the hue range ΔH(k) set in step S14 and fall outside the predetermined color region exist in the input image, such pixels are also to be corrected. Hence, as a method of solving such problem, the image region weight set in step S15 is used.

The image region weight Wp(k) sets a value Wp(k)(x,y) which falls within the range from 0 (inclusive) to 1 (inclusive) so as to apply color correction to pixels in the k-th predetermined color region, and not to apply any color correction to those which fall outside the k-th predetermined color region (for 0≦x≦M−1, 0≦y≦N−1). Also, it is desired to set the image region weight so as to prevent the continuity of a color near the boundary of the predetermined color region by color correction.

The method of setting the image region weight Wp(k) is not particularly limited. For example, a method of calculating the barycenter of the k-th predetermined color region, and determining weights in accordance with the distances between the barycenter and pixels may be used. When this setting method is used, a correction amount for pixels near the boundary of the k-th predetermined color region becomes smaller than that for pixels near the center of the k-th predetermined color region in color correction to be described later, thus preventing the continuity of a color near the boundary of the k-th predetermined color region from collapsing. Also, in another method, a low-pass process may be applied to the k-th predetermined color region using a Gaussian filter or the like to soften a portion near the boundary of the k-th predetermined color region, thus moderating collapsing of the continuity of a color inside/outside the k-th predetermined color region.

Next, counter k is incremented (S16). The processes in steps S13 to S16 are repeated until it is determined in step S17 that k=N, thus setting the representative colors, color regions to be corrected, and image region weights of the extracted predetermined color regions. Note that these setting values are stored in the RAM 202 for respective predetermined color regions, and can be read out for each predetermined color region to be processed.

Target color data is acquired from the target color memory 50 (S18), and correction coefficients used to control correction amounts in color correction are set on the basis of the difference between the representative color and target color (S19). Since the correction amounts in color correction are set in correspondence with hue H and saturation C, correction coefficients are also set as a hue correction coefficient Ph and saturation correction coefficient Pc.

The hue correction coefficient Ph is set to decrease with increasing difference between a hue value Ht of the correction target color and the hue value Hr(k) of the representative color, as described, e.g., by:

$$Ph(\underline{H}_{dist})=K1\cdot\exp(-H_{dist}^2/t1) \quad (4)$$

where K1 and t1 are constants.

$$H_{dist}=|Ht-Hr(k)|$$

That is, the correction coefficient Ph is set so as to apply correction that makes the hue value Hr(k) of the representative color become closer to the hue value Ht of the target color as the hue value Hr(k) of the representative color of the color to be corrected is closer to the hue value Ht of the target color, and not to apply much correction when the hue value Hr(k) of the representative color is largely distant from the hue value Ht of the target color. The reason why the correction coefficient is set in this way is as follows. That is, when the hue value Hr(k) of the representative color of the color to be corrected is largely distant from the hue value Ht of the target color, if correction is made to make the representative color become closer to the target color, the color balance of the entire input image is lost.

Likewise, the saturation correction coefficient Pc is set to decrease with increasing difference between a saturation value Ct of the target color and the saturation value Cr(k) of the representative color. That is, the correction coefficient Pc is set so as to apply correction that makes the saturation value Cr(k) of the representative color become closer to the saturation value Ct of the target color as the saturation value Cr(k) of the representative color of the color to be corrected is closer to the saturation value Ct of the target color, and not to apply much correction when the saturation value Cr(k) of the representative color is largely distant from the saturation value Ct of the target color. However, the saturation correction coefficient Pc is set using different setting methods for a case wherein correction is made to decrease saturation, and a case wherein correction is made to increase saturation. When the saturation level is to be decreased, it is desirable to set the correction coefficient to prevent the impression of the image from becoming unspectacular. Conversely, when the saturation level is to be increased, even when the saturation value Cr(k) of the representative color of the color to be corrected is distant from the saturation value Ct of the target color, correction is made to make it become closer to the saturation value Ct of the target color, so that the effect of improving the impression of the image can be expected. As the setting method of the saturation correction coefficient Pc, when the saturation level is to be increased, equation (5) is used; when the saturation level is to be decreased, equation (6) is used:

When Ct<Cr(k)

$$Pc(C_{dist}) = -a1 \cdot C_{dist}^2 + b1 \tag{5}$$

When Ct≧Cr(k)

$$Pc(C_{dist}) = K2 \cdot \exp(-C_{dist}^2/t2) \tag{6}$$

where a1, b1, K2, and t2 are constants.

$$C_{dist} = |Ct - Cr(k)|$$

Figure 7:
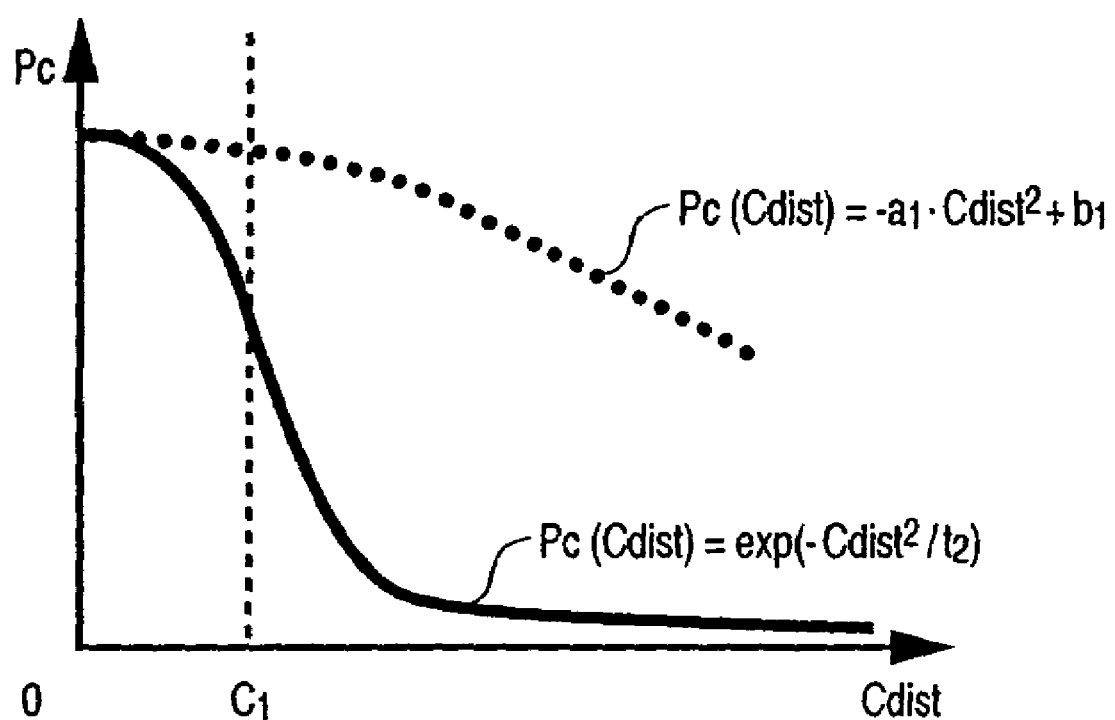
FIG. 7 is a view for explaining a method of setting a saturation correction coefficient Pc.

FIG. 7 is a graph showing equations (5) and (6). The abscissa plots the difference between the saturation value Ct of the target color and the saturation value Cr(k) of the representative color, and the ordinate plots the saturation correction coefficient Pc. As can be seen from FIG. 7, the saturation correction coefficient (solid curve) in correction to decrease saturation and that (dotted curve) in correction to increase saturation have different values even when they have an equal saturation difference, as indicated by C1 in FIG. 7, and the saturation correction coefficient (solid curve) in correction to decrease saturation assumes a smaller value. This indicates that when correction is made to decrease saturation, a correction amount becomes smaller than that used when correction is made to increase saturation.

Figure 8:
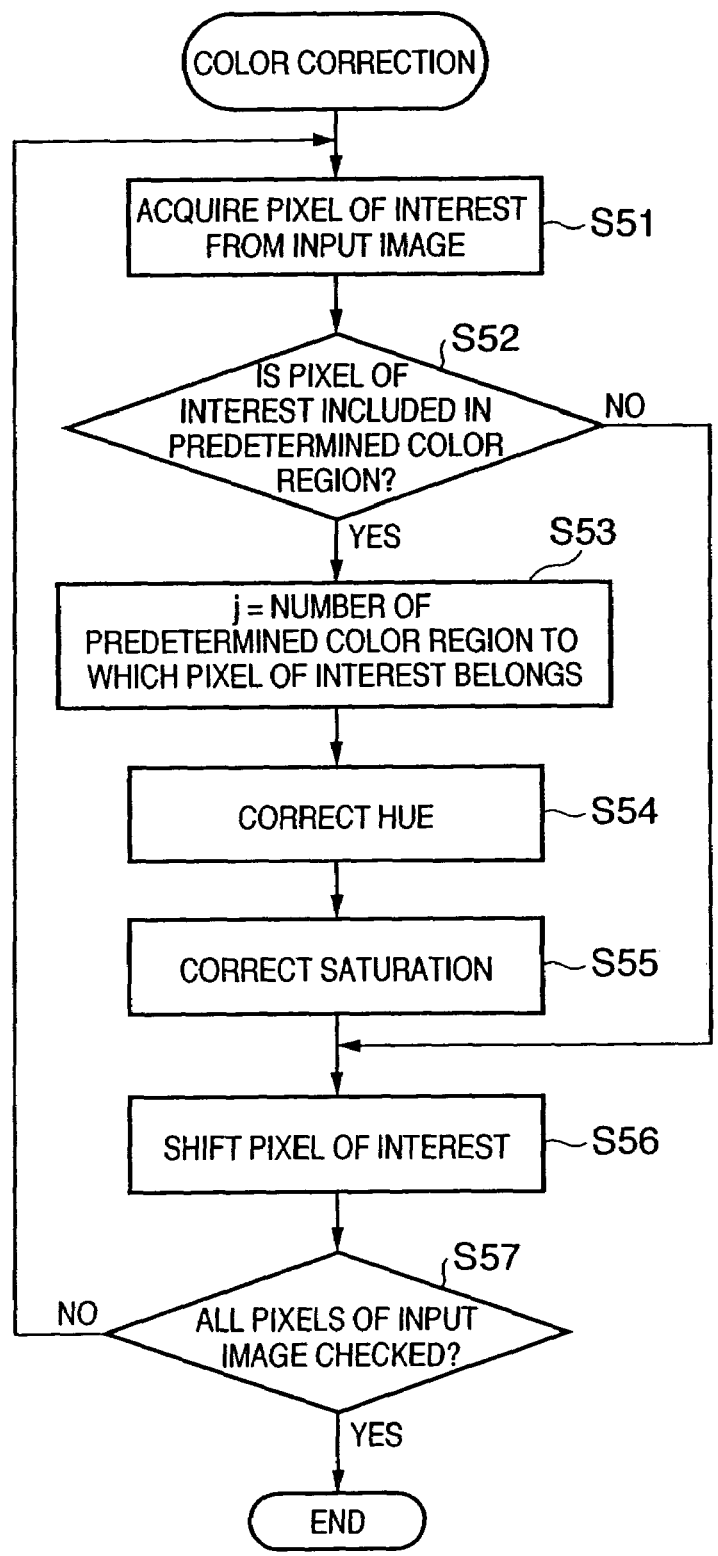
FIG. 8 is a flowchart showing color correction.

Then, the hue and saturation values of pixels to be corrected in the input image are corrected using the representative colors, correction coefficients, color regions to be corrected, and image region weights of the respective predetermined color regions (S20). FIG. 8 is a flowchart showing color correction (S20).

A pixel of interest is acquired from the input image (S51), and it is checked with reference to the label number assigned to the pixel of interest if the pixel of interest is a pixel in a predetermined color region (S52). If the pixel of interest is a pixel in a predetermined color region, the number of the predetermined color region to which the pixel of interest belongs is set in a variable j (S53).

If the pixel of interest belongs to the j-th predetermined color region, the hue value of the pixel of interest is corrected using the setting values of the j-th predetermined color region (S54) by:

$$H' = H + W(j) \cdot Dh(j)$$

$$Dh(j) = Ph(Ht - Hr(j)) \tag{7}$$

$$W(j) = Wh(j) \cdot Wc(j) \cdot Wp(j)$$

where H is the hue value of the pixel before color correction, and H' is the hue value of the pixel after color correction.

Likewise, the saturation value of the pixel of interest is corrected using the setting values of the j-th predetermined color region (S55) by:

$$C' = C\{W(j) \cdot Kc(j) + 1\}$$

$$Kc(j) = Pc\{Ct - Cr(j)\}/Cr(j)(Ct \neq 0) \tag{8}$$

$$W(j) = Wh(j) \cdot Wc(j) \cdot Wp(j)$$

where C is the saturation value of the pixel before color correction, and C' is the saturation value of the pixel after color correction.

More specifically, a saturation correction ratio Kc(j) of the representative color is calculated from the saturation correction coefficient Pc, and the saturation value C of each pixel in the input image is corrected by a product obtained by multiplying the hue region weight Wh(j), saturation region weight Wc(j), and image region weight Wp(j) by the saturation correction ratio Kc(j) (see equations (8)). The saturation correction ratio Kc(j) is expressed by the difference between the saturation value Ct of the target color and the saturation value Cr(j) of the representative color, and the saturation correction coefficient Pc, as described by equations (8).

The pixel of interest is shifted (S56), and it is checked if all the pixels of the input image are checked (S57). The processes in steps S51 to S56 are repeated until all the pixels are checked.

The control returns to the processing shown in FIG. 4. The corrected image is converted into the RGB color space (S24). After that, the corrected image is output in step S7 in FIG. 3.

Modification of Embodiment

In the above embodiment, a case has been mainly explained wherein an image sensed by a digital camera is processed by a computer. Also, the present invention can be applied to the process of an image obtained by scanning a photograph or the like using a scanner. The functions of the above embodiment can be installed not only in the computer but also in a color image device main body such as a digital camera, scanner, display, printer, or the like.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese patent application No. 2004-208883 filed Jul. 15, 2004, which is hereby incorporated by reference herein.

What is claimed is:

1. A color processing method comprising the steps of:
extracting predetermined color regions from an input image;
extracting a representative color from each of the predetermined color regions;
setting a color correcting condition for each predetermined color region, wherein the color correcting condition includes a color range to be corrected set based on the representative color, weight for a color to be corrected set based on the representative color and the color range, and weight for a position of pixel in the input image;
determining whether a pixel of interest of the input image belongs to one of the predetermined color regions or not; and
correcting color of a pixel, which is determined as belonging to the predetermined color region, using the color correcting condition set to the predetermined color region to which the pixel belongs.

2. The method according to claim 1, wherein the color correcting condition further includes a correction coefficient set based on difference between the representative color and a target color, and when the difference becomes large, the correction coefficient is set to decrease degree of the correction in the correcting step.

3. The method according to claim 2, wherein the setting step includes a step of setting the correction coefficient used to decrease a saturation level to be smaller than that used to increase the saturation level.

4. The method according to claim 1, wherein the correcting step corrects hue and saturation of the pixel.

5. The method according to claim 1, wherein the predetermined color region is a skin color region of a person.

6. A computer-readable storage medium storing a computer-executable program for causing a computer to perform a color processing method, the method comprising the steps of:
extracting predetermined color regions from an input image;
extracting a representative color from each of the predetermined color regions;
setting a color correcting condition for each predetermined color region, wherein the color correcting condition includes a color range to be corrected set based on the representative color, weight for a color to be corrected set based on the representative color and the color range, and weight for a position of pixel in the input image;
determining whether a pixel of interest of the input image belongs to one of the predetermined color regions or not; and
correcting color of a pixel, which is determined as belonging to the predetermined color region, using the color correcting condition set to the predetermined color region to which the pixel belongs.

7. A color processing apparatus comprising:
a first extractor, arranged to extract predetermined color regions from an input image;
a second extractor, arranged to extract a representative color from each of the predetermined color regions;
a setter, arranged to set a color correcting condition for each predetermined color region, wherein the color correcting condition includes a color range to be corrected set based on the representative color, weight for a color to be corrected set based on the representative color and the color range, weight for a position of pixel in the input image;
a determiner, arranged to determine whether a pixel of interest of the input image belongs to one of the predetermined color regions or not; and
a corrector, arranged to correct color of a pixel, which is determined as belonging to the predetermined color region, using the color correcting condition set to the predetermined color region to which the pixel belongs.

* * * * *